Nov. 1, 1938.   L. V. WHISTLER ET AL   2,135,316
POINT OR PLANE FINDER
Filed March 11, 1936   3 Sheets-Sheet 1
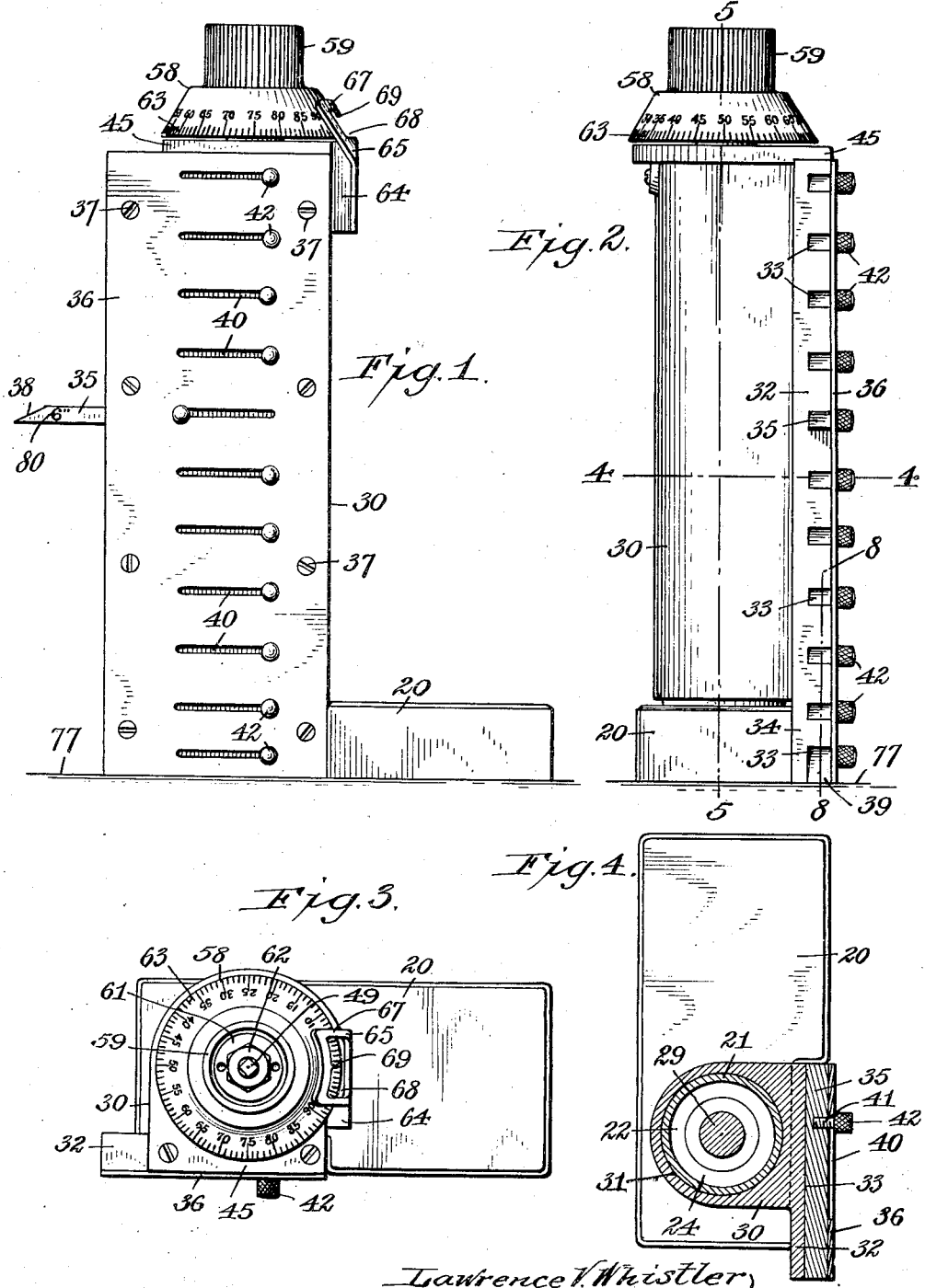

Nov. 1, 1938.   L. V. WHISTLER ET AL   2,135,316
POINT OR PLANE FINDER
Filed March 11, 1936   3 Sheets-Sheet 2
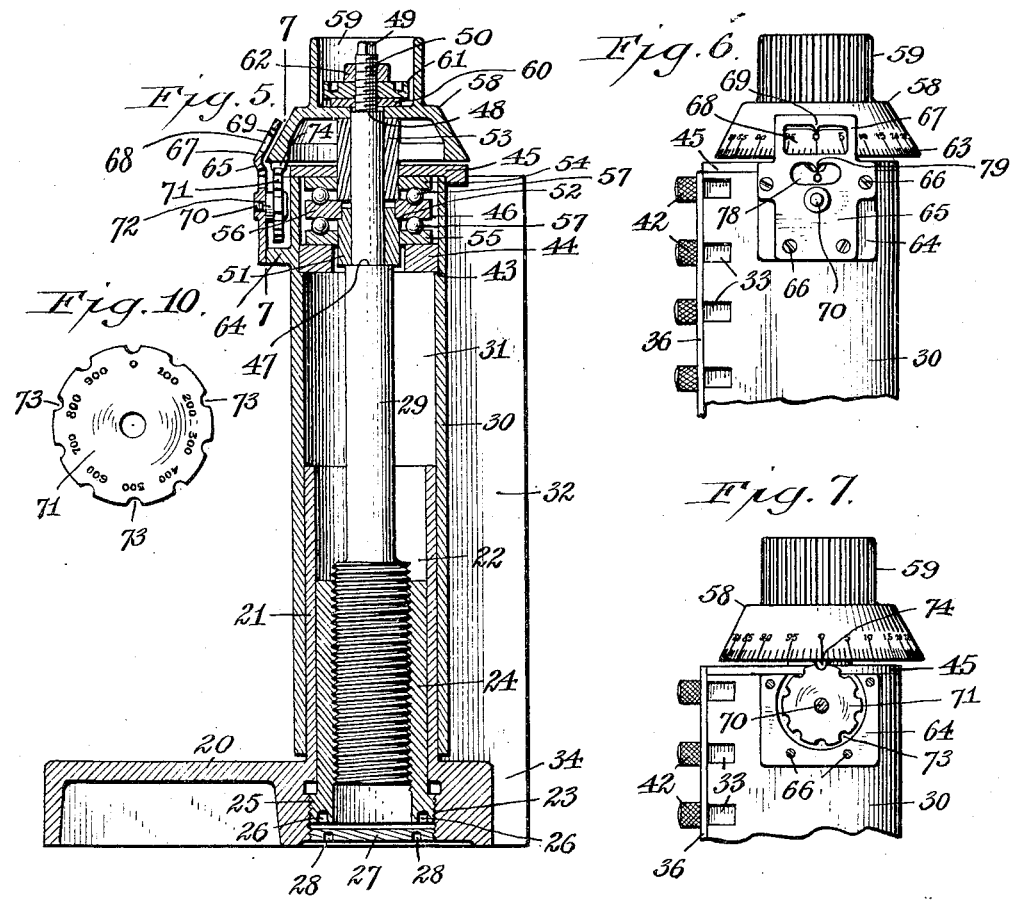
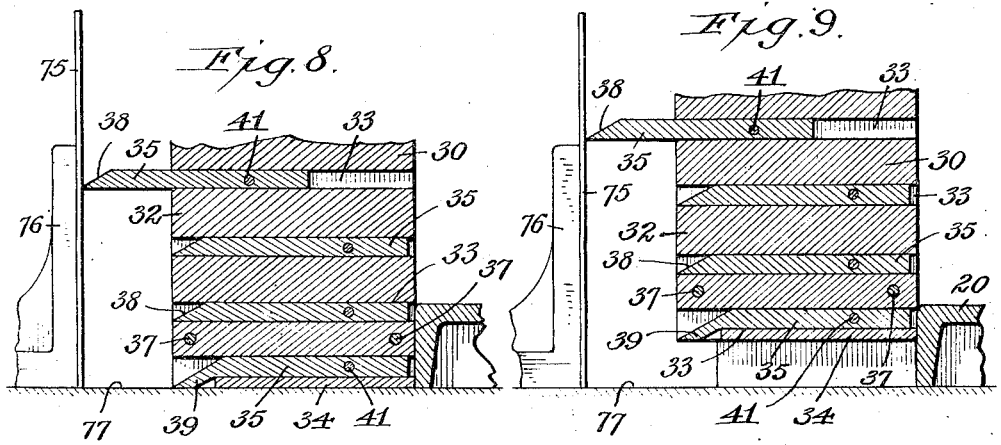
Lawrence V. Whistler
Sanford H. Whistler   Inventors
By Emil Kuehart
   Attorney.

Nov. 1, 1938.                L. V. WHISTLER ET AL                 2,135,316
                              POINT OR PLANE FINDER
                     Filed March 11, 1936          3 Sheets-Sheet 3
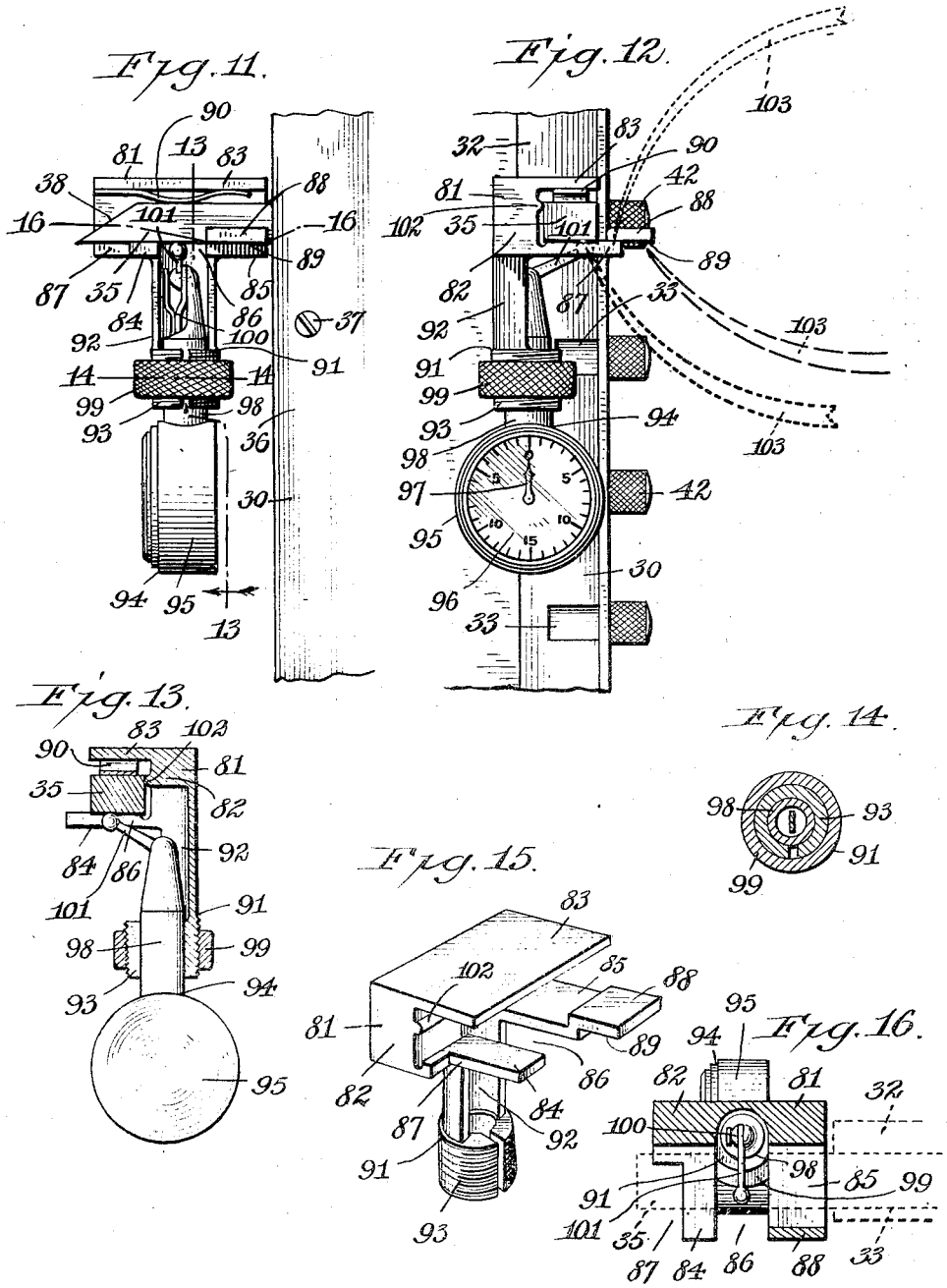

Patented Nov. 1, 1938

2,135,316

UNITED STATES PATENT OFFICE 2,135,316

POINT OR PLANE FINDER

Lawrence V. Whistler and Sanford A. Whistler, Kenmore, N. Y.

Application March 11, 1936, Serial No. 68,210

20 Claims. (Cl. 33—170)

This invention relates to an improved center, point, or plane finder, by means of which measurements can be accurately taken or determined.

Heretofore, when laying out a piece of work or making a templet to be patterned after, or when desiring to ascertain a measurement, surface gauges have been employed, after which vernier-height or other gauges were used to determine the measurements to which the surface gauges were adjusted.

In laying out work, considerable time is required in ascertaining or determining accurate measurements, such as are required in producing sheet metal or other stampings or in manufacturing machine parts, due to the necessity of employing a surface gauge and, depending on the nature of the work, a vernier in connection therewith. In some instances the use of the surface or similar gauge is first resorted to and the measurements, as near as possible, determined by the vernier; while in other cases the vernier is adjusted according to the measurement at which the surface gauge is set. However, the use of a vernier requires calculations on the part of the workman or artisan, and where accurate work is desired these instruments are not depended upon without having the measurements and/or adjustments checked by another workman or artisan, and sometimes rechecked by a third, with the result that the time of two or three workmen is oftentimes employed to assure an accurate measurement, especially when work is planned according to measurements which depend on accuracy to $\frac{1}{1000}$ths of an inch, or even less. It is a common occurrence, where accuracy in measurements is depended upon, to at least check the measurements one or more times, and it oftentimes occurs that inaccuracies are found by the workman or artisan checking the measurements established by another, with the result that the services of a third workman or artisan is sometimes called for to determine which of the two varying measurements is correct. Occasionally, after such difficulties have arisen, a further check is made by the employment of "Johansson" blocks or elements, but all of such methods are slow and expensive and disturb the methodical procedure in a manufacturing plant.

It is the primary object of our invention to provide a device for accurately establishing or determining centers, points, or fixing other measurements without resorting to the use of a vernier of any kind.

Another object of our invention is to provide a device of this kind wherein a plurality of scribers, point finders, or locaters are movable in unison and spaced apart definite units of measurement so that they may be selectively employed.

Another object of our invention is to provide a measuring implement, as it may be more generally termed, for laying out work or for determining measurements of work already produced, either with respect to parts of such work or with respect to a finished or partly finished portion of a piece of work and a portion coacting or adapted to coact or be associated therewith, and by means of which such measurements can be determined by $\frac{1}{1000}$ths of an inch without resorting to the use of vernier gauges or rules, or other measuring devices of any kind in connection therewith.

A further object of our invention is to provide a device of this kind in which a plurality of measuring elements are used which are normally spaced apart definite units of measurement and mounted on a support bodily movable, and wherein one of said measuring elements is employed to determine fractions of the measurement of unit used and the remaining measuring elements are selectively employed to determine the definite unit or units of measurement, minus or plus the fractional unit of measurement established by such first-mentioned measuring element.

A further object of our invention is to provide a measuring device wherein a plurality of measuring elements are employed which are normally spaced apart according to the unit of measurement used and are associated with a movable element maintaining said measuring elements in normally spaced-apart relation, and wherein graduated means for determining the movement of said element by $\frac{1}{1000}$ths of an inch is also employed.

A further object of our invention is to provide a measuring device adapted to be supported upon a flat surface which is used as or has a fixed relation to a point or plane serving as the base for taking or determining measurements and which device has a vertical series of measuring elements so arranged relatively and so manipulated by a single actuating element that the measuring elements may be moved $\frac{1}{1000}$ths of any selected unit of measurement upon movement of said actuating element $\frac{1}{100}$th portion of its range of movement.

A further object of our invention is to provide a measuring device having a series of measuring elements and wherein one of said measuring elements is adapted for adjustable relationship with respect to a fixed object or surface, and wherein all of said measuring elements are spaced apart standard units of measurement, whereby any of such units of measurement, minus or plus any number of thousandths of a unit of measurement, may be determined and conveniently measured or marked.

A still further object of our invention is to provide a measuring device having a measuring element or scriber adjustable or capable of being adjusted to a definite measurement and removably supporting an indicating device whereby any predetermined number of fractional measurements of 1/1000ths of an inch within certain limits can be indicated when associated with a surface gauge adjusted to a definite measurement and adapted for coaction with said indicating device.

With the above and other objects to appear hereinafter, our invention consists in the novel features of construction and in the arrangement and combination of parts to be hereinafter described and more particularly pointed out in the subjoined claims.

In the drawings:

Fig. 1 is a front elevation of our improved measuring device or instrument.

Fig. 2 is a side elevation of the same.

Fig. 3 is a plan view.

Fig. 4 is a cross section taken on line 4—4, Fig. 2.

Fig. 5 is a central vertical section taken on line 5—5, Fig. 2.

Fig. 6 is a side elevation of the upper portion of the measuring device or instrument, opposite that shown in Fig. 2.

Fig. 7 is a vertical section taken on line 7—7, Fig. 5.

Fig. 8 is a vertical section through the lower end of the device, taken on line 8—8, Fig. 2, showing the measuring elements within the sectional region indicated by said line normal position.

Fig. 9 is a similar view, showing the measuring elements in the position they assume when the carrier element carrying the same is elevated substantially 71/1000ths of an inch from the supporting surface of the device.

Fig. 10 is a face view of the hundred indicating disk.

Fig. 11 is a front elevation of a portion of the device showing one of the measuring elements projected from the side of the device and equipped with our improved thousandths indicator, whereby a limited number of 1/1000ths of an inch can be indicated upon movement of a part of said indicating device on the measuring element, the indicator being shown in side elevation.

Fig. 12 is a view showing the indicator in front elevation applied to a measuring element, in association with the curved end of a scriber forming part of a surface gauge, the scriber being shown in two dotted positions.

Fig. 13 is a vertical section taken on line 13—13, Fig. 11, looking in the direction indicated by the arrow crossing said line.

Fig. 14 is an enlarged transverse section taken on line 14—14, Fig. 11.

Fig. 15 is a detached perspective view of the support forming part of the thousandths indicating device and adapted for yielding attachment to a measuring element.

Fig. 16 is a horizontal section taken through the support forming part of said thousandths indicating device and showing in dotted lines the adjacent parts of the measuring instrument or device.

Reference being had to the drawings in detail, the numeral 20 designates a base which is adapted to be set upon a flat plate or other perfectly level surface and which is of a dimension to support the device in a substantial manner. The upper surface of this plate serves, in the exemplification of our invention illustrated, as a base for taking or determining measurements, but it will be apparent that any fixed point or plane above or beneath the surface on which this measuring instrument is placed, may serve as such. Rising from this base is a tubular element 21 which serves as a guide and the bore 22 of which is continued down through the base and is enlarged at its lower end and internally threaded, as at 23. Inserted into the lower end of this tubular element 21 is a sleeve 24 having an enlargement 25 at its lower end, which is externally threaded and engages the threads 23 of the enlarged portion of the bore 22 formed in the base. The enlarged lower end of this sleeve is provided with sockets 26 at diametrically opposite points for the reception of the pins or studs of a spanner wrench to enable the sleeve to be threaded into the tubular element or sleeve 21 and be adjusted therein, as will hereinafter be explained.

To prevent grit or other matter entering the sleeve 24, a closure disk 27 is threaded into the enlarged lower end of the bore 22, and it also has sockets 28 to enable a spanner wrench to be applied thereto for threading this closure disk into position. The sleeve 24 is internally threaded along the major portion of its length and receives the enlarged lower threaded end of an adjusting screw 29.

This device is adapted for use in connection with any unit of measurement; but assuming that the unit of measurement is one inch, the threads whereby the adjusting screw 29 is maintained in engagement with the sleeve 24 are of a gauge so that ten threads will be provided for each inch in the length of the screw, or proportionately if less than one inch in the length of the adjusting screw is threaded.

30 designates a carrier element which is provided with a bore 31 so that it will slidably fit over the tubular element or guide 21 rising from the base 20. This carrier element extends forwardly from the tubular element or guide 21 a greater distance than rearwardly, and its forwardly-extending portion is provided with a lateral flange 32, the front face of this forward extension and said lateral flange being substantially in alinement with the front edge of the base 20, as clearly shown in Figs. 3 and 4; and formed in the surface of both are horizontal grooves 33, the lower walls of which are spaced apart one inch, or any other unit of measurement to which the device is constructed. These grooves extend from the bottom of the carrier element or member to a plane near the upper end thereof, and, as shown, are eleven in number, but any other number of grooves may be employed if desired. The forward extension of this carrier element, which may now be considered as including the lateral flange 32, projects downwardly from that portion thereof fitting over the tubular element 21, as at 34, so that when the parts are in normal position, this downwardly extending portion rests upon the flat plate or other flat supporting surface.

Slidably fitted into each of said grooves 33 is a measuring element 35, preferably in the form of a scriber. These measuring elements are held in their respective grooves 33 by a retainer plate 36 fastened to the front face of said forward extension by means of screws 37, or otherwise, and they are normally positioned wholly within the grooves. One end of each of these measuring elements or scribers is beveled, as shown at 38, so as to form a knife edge terminal for the same, capable of marking or indenting metal or other material. All of these scribers, with the exception of the lower-most scriber, are parallel-sided and straight-lined, while the lowermost scriber has its major portion parallel-sided and straight-lined, but the groove in which it is slidably fitted is elevated slightly from the bottom of the device and consequently from the supporting surface on which the device rests; but since the knife edge of this scriber is to be normally in the plane of said surface, said scriber has a downward extension 39 at its outer end, and in order that the extension of this scriber be capable of complete retraction, the groove 33 receiving it is enlarged at its outer end and opens to the bottom of the carrier element. The retainer plate 36 is slotted transversely in line with the scribers, as at 40, and passing through the slots so formed are securing screws 41 which take into the scribers and have knurled heads 42 at their outer ends for conveniently tightening said screws to cause the heads thereof to bear firmly against the outer surface of the retainer plate and lock the scribers in retracted or projected position, one of said extended scribers being shown in Figs. 1, 8 and 9.

The bore of the carrier element 30 is enlarged at its upper end to form an upwardly-facing internal shoulder 43 against which a thrust-ring 44 bears. Closing the top of said carrier element is a thrust-plate 45 and between said thrust-ring and said thrust-plate a thrust-bearing 46 is arranged.

The adjusting screw 29 is reduced in diameter within the thrust-ring 44 to form an upwardly-facing shoulder 47, and it is further reduced near its upper end to form a second upwardly-facing shoulder 48, the upper extremity of said adjusting screw being of non-circular, preferably square formation, as at 49, to permit of applying a suitable wrench thereto for rotating said adjusting screw; that portion of said adjusting screw between said square terminal 49 and the shoulder 48 being screw-threaded, as at 50.

Surrounding said adjusting screw and bearing against the shoulder 47 is a thrust-sleeve 51 which is reduced at its upper end to form an upwardly-facing shoulder 52. Above the thrust-sleeve 51 and spaced slightly therefrom is a second thrust-sleeve 53. The thrust-bearing 46 comprises a ring or annulus 54 which surrounds the thrust-sleeve 53 and bears against the under side of the thrust-plate 45 and a second ring or annulus 55 which bears against the upper face of the thrust-ring 44. The under face of the ring or annulus 54 and the upper face of the ring or annulus 55 have annular grooves formed therein. Between the two rings or annuli 54 and 55 is a ring or annulus 56 which surrounds the reduced upper end of the thrust sleeve 51 and bears against the upwardly-facing shoulder 52 thereof, and the lower end of the thrust-sleeve 53 bears against the upper surface of said ring or annulus 56; the latter being of a thickness to hold the lower end of the thrust-sleeve 53 spaced from the upper end of the thrust-sleeve 51.

Formed in the upper and lower faces of the ring or annulus 56 are annular grooves, the upper of which cooperates with the annular groove in the under side of the ring or annulus 54 to form a ball raceway, and the lower of which cooperates with the annular groove in the ring or annulus 55 to form a second ball raceway. In each of these raceways a series of anti-friction balls 57 is located for the purpose of taking up any thrust on the adjusting screw, and to enable said screw to be easily rotated.

An actuator 58 is secured to the upper end of the adjusting screw and this is in the form of a hollow truncated cone open at its lower end and closed at its upper end, the wall closing the upper end of said truncated cone having an opening therein through which the adjusting screw extends and it is adapted to bear against the upper end of said second or upper thrust-sleeve 53. Rising from the top wall of said truncated cone is a circular flange 59 which encloses means coacting with the screw-threaded portion 50 at the upper end of said adjusting screw to securely fasten said actuator thereto. For this purpose a spacer or washer 60 is placed over the screw-threaded upper end of said adjusting screw and bears against the top wall of said truncated cone. Threaded onto the screw-threaded upper end of said adjusting screw is a flat circular nut 61 having sockets at diametrically opposite points to receive the pins or studs of a spanner wrench, whereby the nut may be securely fastened to the adjusting screw, the result being that upon tightening said nut the actuator 58 will be firmly held against the upper end of the thrust-sleeve 53. Wear on the lower half of the thrust-bearing may be taken up by tightening the nut 61, and should wear occur in the upper half of said thrust-bearing, the upper end of the carrier element 30 may be slightly filed down to take up such wear. In order to retain the nut 61 in any adjusted position, a jamb nut 62 is applied to the upper threaded end of the adjusting screw so as to firmly bear against the upper face of said adjusting nut 61 and lock the parts in adjusted position.

The exterior of the circular flange 59 is fluted or otherwise roughened to permit of easily manipulating the actuator of which it forms part. The truncated cone portion of said actuator has the exterior of its downwardly sloping wall provided with graduation marks 63 which are preferably one hundred in number and spaced equidistantly around the surface thereof, and this cone portion, so graduated, may be termed an indicating or graduated dial.

The carrier element 30 has on one of its side faces a hollow projection 64, the hollow of which is particircular, and this hollow projection has an indicator plate 65 secured thereto by means of screws 66, or otherwise, said indicator plate having an inwardly-directed extension 67 sloping to conform to the slope of the truncated cone peripheral wall of the truncated cone in close proximity to which it is arranged. This upwardly sloping portion of the indicator plate has a sight-opening 68 formed therein, from the upper wall of which an indicating pointer 69 extends. The graduations on the actuator or dial are exposed through this sight-opening and when the parts are in normal position the graduation mark indicating the character 0 or zero will be underneath said indicating point. I preferably employ graduation marks of two different lengths, the longer of which indicates progressive steps of five graduation marks, and they are so designed by numerals.

Projecting inwardly from the indicator plate 65 is a stub shaft 70, the outer end of which is reduced in diameter and threaded into a correspondingly-threaded opening in said plate so that a shoulder is formed on said shaft which bears against the inner side of said plate; and since said stub shaft has an enlargement or head at its inner end, a definite length is provided between said head and the inner surface of said plate, over which portion is fitted a notched indicating disk or wheel 71 rotatable between said head and a washer 72 interposed between said disk or wheel and the inner surface of the plate. In this manner the indicating disk or wheel is held freely rotatable within the hollow projection, or housing as it may be termed, formed on the carrier element.

The indicating disk 71 is provided with ten peripheral notches 73 marked successively by hundreds from 0 to 900. This indicating disk is actuated upon actuation of the actuator 58, and for this purpose a stud 74 extends downwardly from the edge of the graduated dial and is adapted to successively engage the notches 73 in said indicating disk and rotate the same one-tenth of a complete revolution with each complete revolution of the actuator.

The operation of the device thus far described is as follows: Assuming it is desired that a definite measurement be scribed or otherwise marked on a templet or sheet of metal, designated for example by the numeral 75 in Figs. 8 and 9, the sheet of metal is set on edge as shown in said figures and supported in the usual way against an angular member 76 or other brace resting upon a flat and level surface indicated by the numeral 77, which, in the particular exemplification of our invention illustrated, serves as the base for taking or determining measurements. Now, assuming that the knife edges of the measuring elements or scribers are spaced apart one inch and it is desired to scribe a point on the templet or sheet of metal 75 according to a known measurement, the scriber distant from the surface or base of measurement 77 the exact measurement desired or approaching said measurement is extended from its receiving retainer-groove by loosening the knurled head associated with said scriber and the securing screw of which said head forms part is slid along the slot 40 until the screw reaches the opposite ends of said slot, after which the knurled head is tightened against the outer face of the retainer plate 36. Now, assuming that the desired measurement is exactly three inches from the lower edge of the plate or templet 75, the fourth scriber is extended and the device moved into contact with said plate or templet, the knife edge of said scriber marking the plate at the desired point. If, however, the measurement to be marked on the plate is 3 and $710/1000$ths of an inch from the lower edge thereof, the fourth scriber from the bottom of the series or that marked 3 is projected and the actuator 58 is rotated from its normal position at 0 through seven complete revolutions and continued until the tenth graduation on said actuator is alined with the indicating point 69 on the indicating plate. By reason of the fact that there are ten threads to the inch at the lower end of the adjusting screw, seven revolutions of this screw will elevate the carrier element carrying the series of scribers $700/1000$ths or $7/10$ths of an inch, with the result that all scribers will be elevated that distance from their normal positions. The additional ten graduations through which the actuator is moved will cause one-tenth of a revolution of the adjusting screw or $10/1000$ths of an inch in addition to the $700/1000$ths of an inch given the adjusting screw by rotating it through seven complete revolutions. Since the retracted elements or scribers are ineffective, the extended or projected scriber will be moved along the face of the plate or templet 75 or in close proximity thereto the exact fractional unit of measurement desired in addition to the three inches which the simple projection or extension of scriber member 30 assures. Consequently, when the scriber is brought in contact with the plate or templet 75, it will be 3 and $710/1000$ths inches above the flat supporting surface 77. The point marked on the plate may be used for any desired purpose, but when a center or point is to be scribed which is a definite distance from two edges of the plate, the plate is turned so that an adjacent edge rests upon the flat surface 77. Having determined the distance from one edge of the plate to be 3 and $710/1000$ths inches from said edge, and a measurement being given which is the center of an opening to be formed in the plate six inches from another edge, which is now the edge resting on the flat surface, it is simply necessary to return the carrier member 30 to its normal position by returning the actuator to zero. The seventh scriber from the bottom of the series is then extended in the manner described, after having caused a retraction of the fourth scriber previously extended, and this extended seventh scriber is then moved into contact with the plate or templet 75 so as to mark the same. The intersection of the lines formed on the plate by the fourth scriber from the bottom of the series and the seventh scriber will determine the exact center of the opening to be formed in the pate, whether the plate is used as a templet or as an article of manufacture. It is of course understood that the carrier member may be adjusted to the fraction of the unit of measurement before projecting a scriber from the carrier element, and in the instance mentioned, wherein a measurement of 3 and $710/1000$ths of an inch is to be scribed on the plate or templet, the actuator 58 will be given seven complete revolutions, and in addition thereto $1/10$th of a complete revolution. With each revolution of the actuator 58 the indicator wheel 71 is given a $1/10$th of a complete revolution, bringing up successively the hundreds marked thereon from 0 to 900, so that confusion cannot easily take place in the count of the number of revolutions given the actuator. For this purpose the indicator plate is provided with a sight opening 78 through which a single number is exposed, indicated by an indicating point 79 extending downwardly from the upper wall of said sight opening.

Assuming a measurement is desired which is less than a unit of measurement for which the device is constructed, all measuring elements or scribers will be in retracted position and the lowermost scriber only will be used. The outer end of the lowermost scriber is sloped downwardly so that its knife edge will be on the level with the upper surface 77 of the plate or other support for the device.

Whenever a measurement is desired which is a fraction of the unit of measurement, the lowermost measuring element or scriber may be projected before or after the device is adjusted to the desired measurement. If the measurement desired is 37/1000ths of an inch, the actuator 58 is rotated from 0 to the graduation mark 37 thereon, with the result that the adjusting screw 29 will be given a corresponding rotation and through its screw-threaded connection with the sleeve 24 will be elevated therein 37/1000ths of an inch. By reason of the thrust-bearing connection of this adjusting screw with the carrier element 30 supporting the series of measuring elements or scribers, all scribers will be elevated to a corresponding degree with the result that the lowermost scribers will be moved upwardly from the supporting surface 77, 37/1000ths of an inch; and whether projected previous to so adjusting said carrier element or subsequently thereto, movement of the device toward a workpiece such as 75 or otherwise will enable the exact measurement to be noted thereon by means of the knife edge end of said measuring element or scriber.

It will be apparent from the foregoing that when a measurement less than a single unit of measurement is desired, the lowermost measuring element or scriber only is used. When a measurement involves one or more units of measurement without any fractions, the carrier element will be in its normal or lowered position and the desired measuring element or scriber projected for use, such scribers being designated by numerals, as at 80, to denote their exact number of units of measurement from the supporting surface 77. When the measurement includes a unit or units of measurement with a fraction, the adjustment of the carrier element is of course made to the fraction of the unit of measurement before or after the particular unit of measurement is selected by projecting the measuring element or scriber corresponding thereto.

It will further be apparent that under the arrangement disclosed, the units of measurement are divided into hundredths by the adjusting screw 29, by reason of said screw having exactly ten threads to the unit of measurement, and that it is further divided into thousandths by the graduations on the actuator 58 which are one hundred in number spaced equidistantly around the same. Since there are ten threads to a unit of measurement along the adjusting screw, one complete revolution of said screw will result in the measuring elements or scribers being moved 1/10th of the unit of measurement during each complete revolution of said screw, or in other words, 100/1000ths of an inch. By graduating the actuator 58 into one hundred equal spaces, the rotation of said actuator one space will rotate the adjusting screw 1/100ths of a revolution, with the result that the measuring elements or scribers will be moved 1/1000ths of the unit of measurement.

The device may be used to measure inches, or it may be constructed according to the metric system. In the latter case, however, the screw threads on the adjusting screw will be considerably finer, with the result that approximately twenty-six threads will be employed in each inch in the length of the adjusting screw as compared to ten with the unit of measurement as an inch. Any other unit of measurement, however, may be used, depending on the nature of the work and the precision with which the product is to be manufactured.

There are many instances where an article is to be manufactured to conform to some existing article, or a part of a machine or device is to be made to correspond to some other part and wherein the existing part may have depressed portions opening upwardly, downwardly, or otherwise. In order to produce the co-operating or associated part to conform to the exact measurements of the existing parts, it may be found necessary to determine the exact measurements of the existing part, and particularly portions thereof that may be in the form of depressions upwardly or downwardly. To determine the exact measurement of a depressed portion with respect to the supporting surface 77, as shown in Figs. 8 and 9, or with respect to some other fixed point or plane, a surface gauge is employed, the construction and use of which is understood by those skilled in machine and stamping work. In gauges of this kind a scriber is employed which has a curved end so that the point may be engaged with the deepest point thereof, and when such a condition arises we employ in connection with any selected one of the series of measuring elements or scribers a thousandths indicator and associate it with a support to be adjustably applied to any selected measuring element or scriber. The indicating device, when hereinafter referred to as such, is intended to include the detachable support, unless otherwise specifically stated or defined. The indicator proper, minus our improved support for the same, is a device now in common use and well known to those skilled in the art to which this invention relates, but we have associated it with the support, which has gauge surfaces corresponding to the knife edge or other marking or indicating point of the measuring elements or scribers of our improved device.

It may be here stated that while we have shown the measuring elements or scribers provided with beveled outer ends to form knife edges, these ends may be pointed or otherwise formed, as may be desired. As a convenient means of slidably fitting them within the carrier element 30, we prefer to make them of rectangular formation in cross section and detachably apply thereto a support 81, shaped as clearly shown in Fig. 15. This support has a comparatively thick side or edge wall 82, a top wall 83 overhanging therefrom, a sectional bottom wall, one section 84 of which is separated from the other section 85 by an intervening space 86. The sectional bottom wall is somewhat wider than the top wall, as clearly shown in Figs. 12 and 13, and the section 84 is cut away from the outer end of the support a suitable distance inwardly, as at 87. The section 85 is provided with an offset or angular outward extension 88 which forms an inwardly-facing shoulder 89 and the under surface of which is in horizontal alinement with the upper surfaces of the inner portion of said section and of section 84. While the space between the shoulder 89 of said angular extension and the inner surface of the comparatively thick side wall 82 of said support is wider than a measuring element or scriber to which the support may be applied, said angular extension nevertheless serves to prevent lateral accidental disengagement of the support from the measuring element or scriber, as well as a gauge element. The space between the top wall 83 and the sectional bottom wall is also greater than the height of each scriber, so that the scriber can be easily entered between the top and bottom walls. However, since the space in said support is greater than the dimension of each of the measuring elements or scribers, which space serves as a receiving opening for a scriber, some provision must be made to maintain the support in its proper position on a scriber, and for this purpose, after placing the support on a scriber, it is yieldingly held in position by a flat or leaf compression spring 90 riveted or otherwise secured to the under side of the top wall 83 and bearing with its curved intermediate portion against the upper side of the measuring element or scriber to which the support is fastened.

Depending from the side or edge wall 82 is a clamping member 91 which comprises a semi-cylindrical upper portion 92 opening to the front of the device, and a split ring 93 integral with said semi-cylindrical portion and externally screw-threaded. If desired, the split ring portion may be given a slight upward bevel exteriorly.

94 designates the thousandths indicator proper, which comprises a circular casing 95 having a dial 96 with graduation marks arranged from 0 to 15, or any other number clockwise and counterclockwise, an indicating finger 97 actuated by the mechanism within said casing being normally at 0. This device of course may be varied so as to be arranged for clockwise actuation only and the graduations continued through the complete circle. However, indicators of this kind which are in most common use are adapted for reversible action to indicate plus and minus, and the movement of the indicating finger 97 along the graduation marks in either direction will indicate $\frac{1}{1000}$ths of an inch for each graduation. The mechanism within the casing extends outwardly therefrom through a cylindrical stem 98 which is passed through the split ring 93 and clamped therein by a ring nut 99 threaded onto said split ring. The upper end of this stem is tapered upwardly, and one side thereof is open to expose actuating elements 100 forming part of the mechanism within the casing 95, which includes a surface gauge lever 101 normally arranged at an oblique angle to the stem 98 and at its outer end having a contact ball or other contact element.

This indicating device 94 is applied to any selected measuring element or scriber by slipping the same thereon with one side edge of the measuring element or scriber in contact with a longitudinal rib 102 formed on the inner surface of the side or edge wall 82, and the under side of the measuring element or scriber in firm contact with the upper surface of the sectional bottom wall, the support 81 being held in such position by the spring 90. When the indicating device is so applied, the under side of the measuring element to which it is applied, the upper side of the section 84 of the bottom wall and the under side of the angular extension 88, or the offset outer portion of the section 85 as it may be termed, are all in the same plane. Therefore, said three surfaces serve as a single base for taking or determining fractional measurements when using said indicating device.

It is to be noted that the section 84 of the bottom wall extends outwardly beyond the measuring element or scriber to which it is attached, and therefore the upper surface of this extended portion is utilized as a gauge surface against which the end of the curved terminal of a measuring element or scriber forming part of a surface gauge is adapted to contact, as indicated by light dotted lines at 103, Fig. 12.

Attention is also called to the fact that by reducing the length of the section 84 by means of the cut-away portion 87, a comparatively large area on the under side of the measuring element or scriber 35 is exposed so that the curved terminal of a measuring element or scriber 103 forming part of a surface gauge can be positioned beneath said measuring element or scriber 35, as indicated by heavy dotted lines in Fig. 12, to determine the variation between the measurement at which said gauge is set and that to which the measuring element is adjusted. The space 86 between the two sections 84 and 85 of the bottom wall is provided to enable the terminal of the surface gauge lever 101 of the indicating device to contact with the under side of the measuring element or scriber 80, and when in this position the finger 97 of the indicator 94 will be at "0". Assuming the measuring element or scriber 103 of the surface gauge to have been positioned as and adjusted to the height shown with dotted lines in Fig. 12, and that it was so positioned and adjusted by engaging it with the lowermost point of an upwardly-opening depression in an object, the exact measurement of which, with respect to the support on which the object rests, it is desired to determine, the pointed terminal of this measuring element or scriber 103 is then moved into close proximity to the support 81, without touching the same, said pointed terminal will have been positioned to the exact measurement of the distance between the bottom of said depression and the support on which the surface gauge rests, and it may be in a plane beneath that of the upper surface of the section 84 forming part of the bottom wall of said support. It will therefore be necessary to depress the support 81 against the action of the spring 90, whereupon the indicator will be lowered so that a slight change in the angularity of the surface gauge lever 101 will take place, with the result that the indicating finger 97 will travel over the dial of the indicator in proportion to the change in angularity of said lever. The indicating device, which includes the support 81 and the indicator 94 proper, is of course depressed on the measuring element or scriber supporting it, until the point of the scriber 103 is in the plane of and is moved into contact with the upper surface of the wall section 84. The measuring element or scriber 35 of the measuring device on which the indicating device is yieldingly secured will indicate the number of units of measurement, while the exact measurement of the terminal of the scriber 103 will be indicated, by deducting any fraction or fractions of the units of measurement from the measurement of the scriber 35, which fractional unit of measurement will be indicated by the indicating finger 97 of the indicating device 94.

When a measurement of a downwardly opening depression on an object is to be determined with respect to the surface on which the object rests, or to some other fixed point, the measuring element or scriber 103 of the surface gauge is reversed, and when adjusting the indicating device to this reversed position of the measuring element or scriber, the pointed terminal thereof is brought into contact with the under side of the extension 88 on wall section 85, as shown by dash lines 103 in Fig. 12, after determining the exact position of the measuring element 35 to which the indicating device is to be attached.

It will be apparent that on account of the limited range of indications on the indicating device 94, it will not be usable for all purposes, and in many instances will have to be employed in connection with adjustments approximately made with our improved measuring device.

Wherever it is used, it will quickly and definitely indicate measurements by 1/1000ths of the unit of measurement up to a certain number of thousandths, and in many instances requires no adjustment of our improved measuring device, since it can be directly attached to a measuring element or scriber 35 of our improved device without adjusting the same.

Having thus described our invention, what we claim is:—

1. A measuring device, comprising a support resting upon a flat surface serving as a base for taking or determining measurements, a vertical series of measuring elements spaced equidistantly apart according to a definite unit of measurement and being so maintained regardless of the measurements taken, said measuring elements being bodily movable on said support into or out of measuring positions, and means to move said measuring elements in unison any predetermined distance from said base of measurement, said means including a prime mover serving as the sole element to be manually manipulated.

2. A measuring device, comprising a support, a series of measuring elements spaced equidistantly apart on said support according to a definite unit of measurement and being so maintained regardless of the measurements taken, and means including a rotatable element serving as the sole element to be manipulated by hand to cause micrometrical movement of said measuring elements on said support with respect to a given point or plane serving as a base from which measurements are gauged.

3. A measuring device, comprising a support adapted to rest upon a surface serving as or establishing a base for taking or determining measurements and having an upwardly-directed element serving as a guide, a carrier adapted for movement on said upwardly-directed element, a series of measuring elements on said carrier normally retained in a protective manner out of measuring positions and spaced predetermined distances apart, said measuring elements being selectively movable into measuring position, and means incorporated in the construction of said measuring device for adjusting said carrier on said upwardly-directed element.

4. A measuring device, comprising a support having a fixed relation to a point or plane used for taking or determining measurements, an element movable on said support, a measuring element on said movable element normally positioned to register with said point or plane, a measuring element on said movable element spaced a definite distance from said first-mentioned measuring element, and means for causing micrometrical adjusting of said movable element to move said first-mentioned measuring element any micrometric distance from said point or plane and to move said second-mentioned measuring element simultaneously therewith, there being associated with said means, means to enable a direct reading and display of the hundred-thousandths adjustment made and a reading of the additional thousandths over the hundred-thousandths directly displayed.

5. A measuring element, comprising a support resting upon a flat surface serving as a base for taking or determining measurements and having an upwardly-directed element serving as a guide, a carrier element guided for vertical movement on said guide, an adjusting element operatively connected with said carrier element to move the latter and being movable with reference to said support, a plurality of measuring elements having scribing ends normally spaced equidistantly apart in accordance with a unit of measurement, and so maintained under all conditions for taking measurements, and means for actuating said adjusting element including graduations associated with said adjusting element and said carrier element for accurately determining the degree of the adjustment to be made.

6. A measuring element, comprising a support resting upon a flat surface serving as a base for taking or determining measurements and having an upwardly-directed tubular element serving as a guide, a carrier element guided for vertical movement on said guide, an adjusting screw connected with said carrier element and threaded into said support within said upwardly-directed tubular element, a plurality of measuring elements protectively and horizontally disposed and arranged on said carrier element to permit said measuring elements to be selectively moved into or out of measuring positions, and means for actuating said adjusting screw and through the latter adjusting said carrier and including a graduated element thereon, the graduations of which coact with a fixed point on said carrier element to accurately disclose the degree of rotation of said adjusting screw and the consequent adjustment of said plurality of measuring elements with respect to the said base.

7. A measuring device, comprising a support having a fixed relation to a point or plane used for taking or determining measurements, a carrier element rectilinearly adjustable on said support, a measuring element having a scribing terminal supported by said carrier, an adjusting screw threaded into said support and being the sole means for moving said carrier element, said adjusting screw being connected to said carrier element in a manner to cause rectilinear movement of the latter during rotation of said adjusting screw, said adjusting screw having a predetermined number of screw threads per unit of measurement employed in said measuring device, a rotatable element for causing rotation of said adjusting screw and graduated for determining any degree of fractional rotative movement thereof and thereby produce a predetermined micrometrical adjustment of said measuring element under any number of predetermined rotations or any fractional degree of rotation of said adjusting screw.

8. A measuring device, comprising a support having a fixed relation to a point or plane used for taking or determining measurements, said support including a base and an upstanding tubular element, a sleeve secured in said base from the bottom thereof and being vertically adjustable therein, a carrier element having a tubular portion into which the upstanding tubular element of said base extends, an adjusting screw axially disposed within said tubular element and the tubular portion of said carrier element, said sleeve being internally threaded and having said adjusting screw threaded thereinto, a dial secured to the upper end of said adjusting screw and having graduations around the same, said carrier having an index thereon with which said graduations coact, and a plurality of measuring elements supported by said carrier elements.

9. A measuring device, comprising a support having a base and a vertically-disposed sleeve adjustable in said base, said base having a tubular guide into which said sleeve extends and having fixed relation to a point or plane used for taking or determining measurements, a carrier element vertically movable on said tubular guide, an adjusting screw having its screw-threads threaded into said sleeve and having ten screw-threads thereon to one inch in the length thereof, a plurality of measuring elements carried by said carrier element and fixedly spaced thereon, said measuring elements being so maintained under all measurement-taking adjustments, said adjusting screw when rotated causing movement of said carrier element, and a dial secured to said adjusting screw and vertically movable therewith and also provided with one hundred graduations, any one of which latter also may be brought into registration with a fixed point of said carrier element, the rotation of said dial the distance of a space between adjacent graduations causing one one-hundredths of a revolution of said adjusting screw and a movement of one one-thousandths of an inch of said measuring elements with respect to the point or plane used for taking or determining measurements.

10. A measuring device, comprising a support having a fixed relation to a point or plane used for taking or determining measurements, a carrier element movable on said support, a plurality of measuring elements carried by said carrier element and movable independent of the latter to selectively enable said measuring elements to be positioned into or out of measuring positions on said carrier element, and means to effect a micrometrical adjusting of said measuring elements with respect to the point or plane used for taking or determining measurements.

11. A measuring device, comprising a support having a fixed relation to a point or plane used for taking or determining measurements, a carrier element vertically movable on said support and having a plurality of horizontal grooves therein, a measuring element slidably arranged in each of said grooves to enable said measuring elements to be selectively projected therefrom, means to secure said measuring elements in retracted or projected positions, and means to micrometrically adjust said carrier element with respect to the point or plane used for taking or determining measurements.

12. A measuring device, comprising a support having a fixed relation to a point or plane used for taking or determining measurements, a carrier element vertically movable on said support and carrying measuring elements, said carrier element having an indicating point thereon, means for adjusting said carrier element on said support including a dial having graduations adapted for coaction with said indicating point, an indicating disk divided into a series of sections, and coacting means between said graduated dial and said indicating disk whereby the latter is moved from one section to another with each completed revolution of said graduated dial.

13. A measuring device for determining measurements, comprising a carrier element adjustable with reference to a point or plane used for taking or determining measurements, a primary measuring element supported by said carrier element, and an indicator yieldingly secured to said primary measuring element and having a part movable under force to determine microscopical differences in measurement between that at which said primary measuring element is adjusted and the position at which a surface gauge is set so as to enable the final adjustment of said carrier to said surface gauge in accordance with such variation in measurements upon bringing said primary measuring element and said surface gauge into contact with each other.

14. A measuring device for determining measurements, comprising a carrier element adjustable with reference to a point or plane used for taking or determining measurements, a primary measuring element on said carrier element and approximately adjusted to the measurement to be accurately determined, and an indicator comprising a support yieldingly applied to said primary measuring element and having a depending portion serving as a clamp, and an indicating element having a stem clamped within said depending portion and provided with a contact element in contact with said primary measuring element and in operative connection with the mechanism of said indicating element, said support being movable under pressure to effect movement of said contact element and cause registration of said indicating element whereby the difference in measurement between a surface gauge and the measurement at which said primary measuring element is set can be easily determined.

15. A measuring device, comprising a support having a fixed relation to a point or plane used for taking or determining measurements, a carrier element vertically movable on said support, a measuring element projecting from said carrier element, means to adjust said carrier element micrometrically to set the same at any desired measurement to correspond to or closely approach a measurement to which a surface or other gauge is adjusted, an indicating device for indicating small fractions of a unit of measurement by thousandths of such unit and yieldingly and removably applied to said primary measuring device, said indicating device being yieldingly applied to said measuring element and having a contact surface adapted to be brought into contact with said gauge under yielding movement on said primary measuring element whereby said indicating device will disclose the difference in the measurement at which the said primary measuring element is set and the measurement at which said gauge is set.

16. An indicator for use in connection with a measuring device having a measuring element extending therefrom, said indicator comprising a support having spaced-apart members between which said measuring element is to be placed, a spring yieldingly supporting said indicating device on said measuring element located within said support and bearing against said measuring element, said support having a depending portion, an indicating element comprising a housing having indicating means therein, a dial to indicate thousandths of a unit of measurement and a contact element connected with the indicating mechanism of said indicating element and adapted for contact with the under side of said measuring element so that upon movement of said support on said measuring element said contact element is caused to move and actuate the indicating mechanism within said casing.

17. An indicator for use in connection with a measuring device having a securing portion removably and yieldingly secured to said measuring element, a clamping portion depending from said securing portion and having a split sleeve at its lower end, an indicating device having a casing, a stem projecting from said casing and passed through said split sleeve, indicating mechanism within said casing, and a contact element movably arranged at the upper end of said stem in contact with said measuring element and in operative connection with the indicating mechanism within said casing, said contact element being moved upon movement of said support on said measuring element.

18. A measuring device, comprising a support, a carrier vertically movable on said support, a series of measuring elements carried by said carrier and spaced apart definite units of measurement, said measuring elements being selectively movable into and out of said carrier and means to micrometrically move said carrier any predetermined distance.

19. A measuring device, comprising a support, a carrier element vertically movable on said support, a series of measuring elements carried by said carrier element, said carrier element having an indicating point thereon, means for adjusting said carrier element on said support including a rotatable member having graduations adapted for co-action with said indicating point, an indicating element divided into a series of numbered sections, and co-acting means between said rotatable member and said indicating element whereby the latter is moved a distance equaling that between the centers of two adjoining sections thereon with each complete revolution of said rotatable member.

20. A measuring device, comprising a support, a carrier element movable along said support and carrying a series of equidistantly spaced measuring elements, said carrier element having an indicating point thereon, means for adjusting said carrier element on said support including a movable element having graduations adapted for co-action with said indicating point, movement of said movable element the distance of each graduation indicating movement of said carrier element a distance of one one-thousandths of an inch, and means actuated by said movable element after each cycle of movement of the latter to progressively indicate one-hundred one-thousandths of an inch, said means being progressively numbered in hundreds to enable a direct reading of the micrometrical adjustment made.

LAWRENCE V. WHISTLER.
SANFORD A. WHISTLER.